United States Patent [19]

Lee

[11] Patent Number: 5,528,334
[45] Date of Patent: Jun. 18, 1996

[54] SYSTEM AND METHOD FOR RECORDING SUCCESSIVE IMAGES OF THE SAME OBJECT AT VARYING DEPTHS OF FIELD

[75] Inventor: Jong-tae Lee, Kyunggi-do, Rep. of Korea

[73] Assignee: Samsung Aerospace Industries, Ltd., Kyeongsangnam-do, Rep. of Korea

[21] Appl. No.: 408,715

[22] Filed: Mar. 22, 1995

[30] Foreign Application Priority Data

Jun. 15, 1994 [KR] Rep. of Korea ..................... 94-13528

[51] Int. Cl.⁶ .................................................. G03B 7/00
[52] U.S. Cl. ............................................. 354/412; 354/446
[58] Field of Search ................................. 354/412, 446, 354/400, 402

[56] References Cited

U.S. PATENT DOCUMENTS 4,829,331  5/1989  Aihara ..................................... 354/400

Primary Examiner—Michael L. Gellner
Assistant Examiner—Eric Nelson
Attorney, Agent, or Firm—Finnegan, Henderson, Farabow, Garrett & Dunner

[57] ABSTRACT

A system and method for recording successive images of the same object at varying depths of field. An automatic distance measuring circuit measures the distance from an object, and a brightness measuring circuit measures the ambient brightness around the object. A shutter release switch is activated in first and second steps. A microcontroller controls the system and is connected to the automatic distance measuring circuit, the brightness measuring circuit, a shutter actuator, a diaphragm actuator, and a film motor actuator. After pressing the shutter release button once, a plurality of images are automatically recorded, each having the same exposure and a different depth of field.

19 Claims, 3 Drawing Sheets

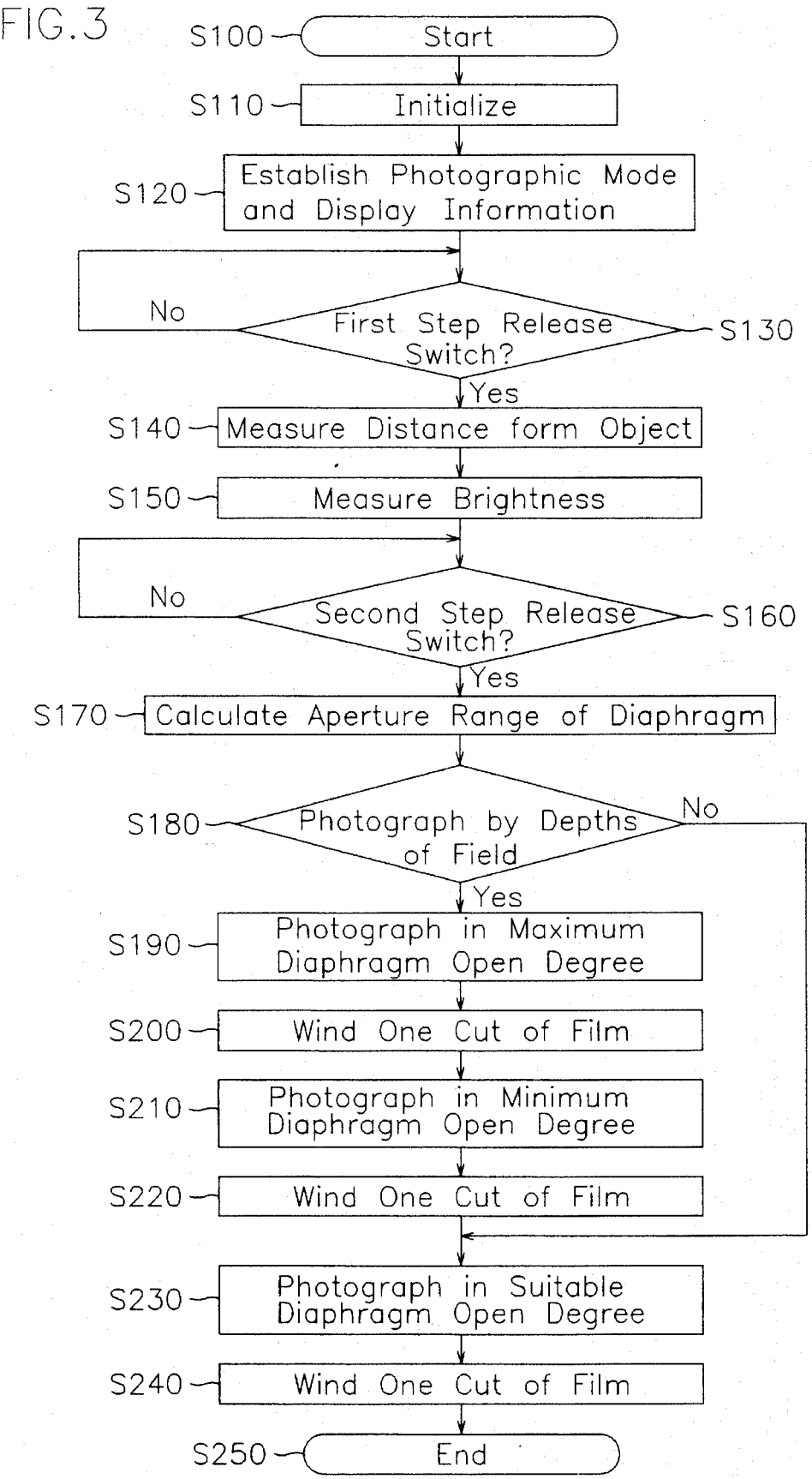

SYSTEM AND METHOD FOR RECORDING SUCCESSIVE IMAGES OF THE SAME OBJECT AT VARYING DEPTHS OF FIELD

BACKGROUND OF THE INVENTION

1. Field of the Invention

The present invention relates generally to a system and method for recording successive images of the same object at varying depths of field. The system takes successive photographs at varying depths of field using a camera and related control method. Multiple photographs of the same object are automatically obtained at varying depths of field within a photographic range of the object when a user takes a photograph using an automatic exposure camera and photographic devices.

2. Description of Related Art

The modern 35 mm camera provides the user with several creative options and controls. As well as composition and camera placement, the user can adjust the lens aperture opening and shutter speed. To obtain a satisfactory photograph, each of these controls must be successfully manipulated.

For example, the lens aperture opening which is often expressed as an F stop number (the ratio of the lens focal length to the lens opening) controls the depth of field of the photograph. The depth of field refers to the depth of the photograph which is acceptably in focus. A photographic lens will only focus on one plane. However, objects spaced close enough to the plane of focus will appear acceptably in focus. Generally, the permissible range around the focused object in which other objects appear to be focused is called "depth of field." The smaller the opening of the lens or the larger the F stop, the greater the depth of field.

As the opening in the lens is decreased to obtain a greater depth of field, however, the shutter speed must be decreased to obtain the same exposure value. A long shutter speed will result in blurring of quickly moving objects and will lead to a greater blur of the overall image in hand-held cameras.

Correct exposure is critical for successful photography. The exposure refers to the amount of light which reaches the image plane and is related to both the F stop and the shutter speed. The smaller the F stop and the longer the shutter speed the greater the amount of light which will reach the image plane. In fully manual cameras, the photographer must manually set both the F stop and the shutter speed. In newer, automatic exposure cameras the camera automatically measures the amount of light and sets the exposure. In programmable cameras, the camera will set both the F stop and the shutter speed.

A conventional automatic exposure camera has multiple exposure programs to obtain various effects. Exemplary exposure programs are an aperture-priority program, a shutter speed-priority program, a deep depth of field program, a rapid shutter speed program and so In addition, since the impression of the photograph differs according to the degree of exposure, a function is required that the user takes the photograph by adjusting the degree of exposure. Using an auto-bracket program three of photographs having the measured exposure, overexposure, and underexposure can be obtained with only one release.

The photograph is varied to a great deal in accordance with the depth of field, because it is impossible to focus on all the objects to be photographed when composing the photograph. The programs in the automatic exposure camera related to the depth of field are the aperture-priority program and the deep depth of field program. However, there are disadvantages in that the user selects the aperture in the aperture-priority program, and photographs having a deep depth of field are only possible using the deep depth of field program.

Generally, because it is difficult to take a photograph while adjusting the depth of field, there is the disadvantage that an amateur or a beginner may not consistently take acceptable photographs.

SUMMARY OF THE INVENTION

An object of the present invention is to provide a system for taking successive photographs at various depths of field in a camera that overcomes the problems and disadvantages of the conventional devices.

The features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve this and other objects and in accordance with the purpose of the invention, as embodied and broadly described herein, a system and method for recording successive images of the same object at varying depths of field is provided. A release switch is activated in first and second steps. First means measure the distance from an object to be recorded and produce a signal corresponding to the distance when the release switch is activated in the first step. Second means measure the ambient brightness around the object and produce a signal corresponding to the brightness when the release switch is activated in the first step. Third means calculate a suitable aperture range of diaphragm from the distance measured by the first means and the ambient brightness measured by the second means when the release switch is activated in the second step, calculate suitable exposure values corresponding to a plurality of open degrees of the diaphragm within the aperture range of the diaphragm, and produce signals for controlling the aperture of diaphragm and a shutter speed in accordance with the suitable exposure value in order to take successive photographs at varying depths of field. Fourth means adjust the open degree of the diaphragm in accordance with the signal for controlling the aperture of the diaphragm. Fifth means activate a shutter in accordance with the signal for controlling the shutter speed.

The system may further include a photographic mode switch by depths of field to take simultaneous photographs at varying depths of field, and the third means calculates the suitable exposure value when the photographic mode switch by depths of field is activated. And in this case, the system may further include sixth means for displaying whether the photographic mode switch by depths of field is activated.

According to yet another aspect of the present invention, a method for taking simultaneous photographs by depths of field for a camera includes the steps of initializing an internal circuit of the camera when power is applied; measuring the distance from an object and the ambient brightness around the object when a release switch is activated in a first step; calculating a suitable aperture range of diaphragm from the measured distance and the measured ambient brightness when the release switch is activated in a second step, and calculating suitable exposure values corresponding to a plurality of open degrees of the diaphragm within an aperture range of diaphragm; and activating the diaphragm and a shutter in accordance with the suitable exposure value and taking a plurality of photographs having different depths of field than one another.

The objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate one embodiment of the invention and together with the description, serve to explain the principles of the invention.

In the drawings.

FIG. 3 is a flowchart showing the operation of the system for taking successive photographs at varying depths of field for a camera according to the preferred embodiment of the present invention.

DESCRIPTION OF THE PREFERRED EMBODIMENT

Reference will now be made in detail to the preferred embodiment of the invention, an example of which is illustrated in the accompanying drawings.

Figure 1:
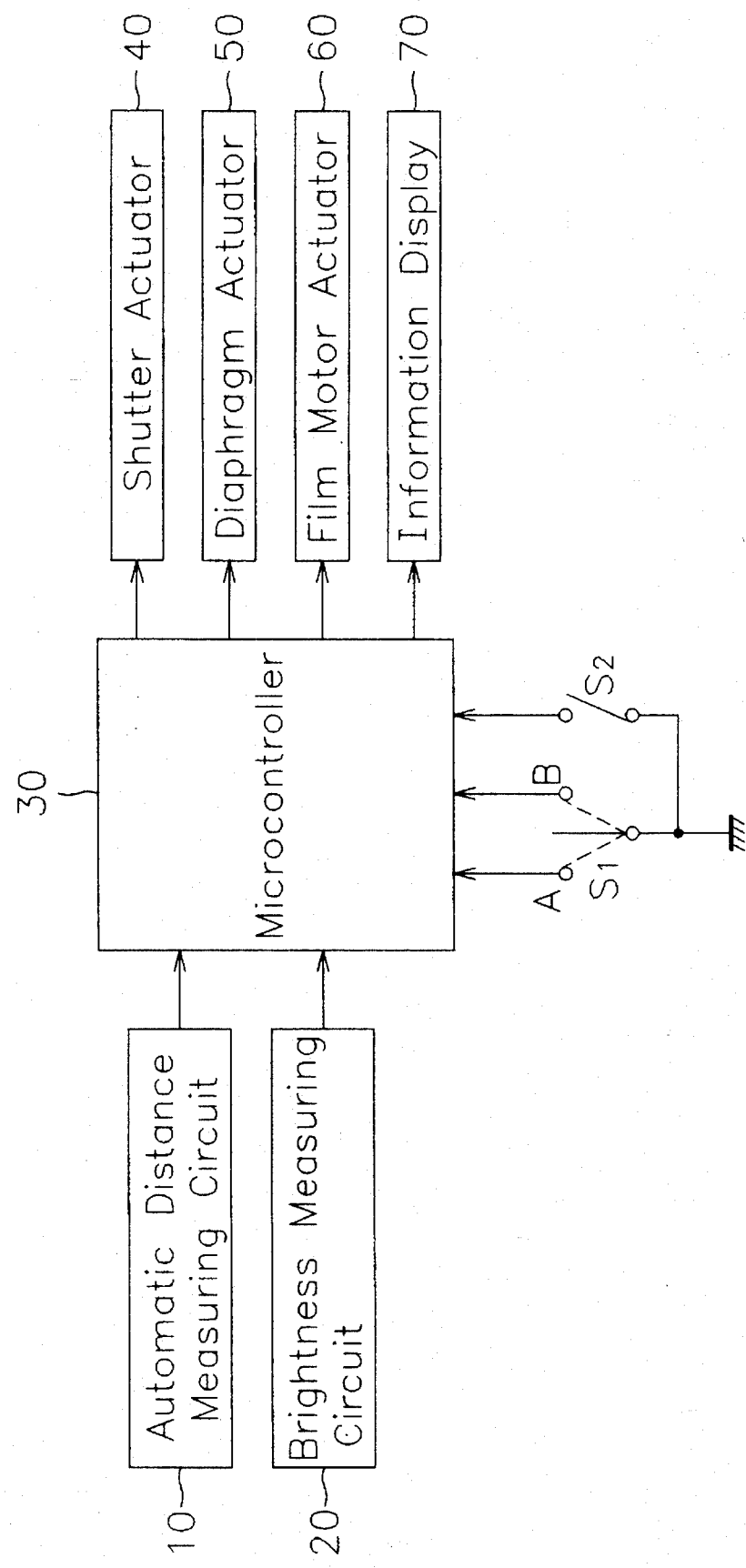
FIG. 1 is a block diagram of a system for automatically taking successive photographs at varying depths of field for a camera according to a preferred embodiment of the present invention.

In FIG. 1, a system for recording successive images of the same object at varying depths of field is shown. The preferred embodiment of the present invention is a still picture photographic camera. For example, a 35 mm camera may embody the invention. However, other image recording devices and other film formats may be within the scope of this invention.

An automatic distance measuring circuit 10 measures the distance from an object to be recorded to the camera. A brightness measuring circuit 20 measures the ambient brightness around the object. The brightness measuring circuit may include, for example, an average reflected light meter, an incident light meter, a spot meter, or a matrix meter. A release switch S1 is activated in first and second steps. A photographic mode switch S2 selects programs for different depths of field. A microcontroller 30 is connected to output terminals of the automatic distance measuring circuit 10, the brightness measuring circuit 20, the release switch S1, and the photographic mode switch S2. A shutter actuator 40, a diaphragm actuator 50, and a film motor actuator 60 are activated according to signals from the microcontroller 30.

In accordance with this invention, after pressing the shutter release button once, a plurality of images are automatically recorded, each having a different depth of field but the same exposure value. Thus, the camera automatically brackets depths of field. The camera user may set the number of photographs automatically taken and the range of bracketed F stop settings.

The operation of the camera according to an embodiment of the present invention will be explained with reference to the accompanying drawings. FIG. 3 shows a flow chart of the operation of the system shown in FIG. 1.

When power is applied to the camera, the microcontroller 30 initializes photographic conditions, that is, all circuitry and all variables at Step 110 in FIG. 3.

The camera may have the photographic mode switch S2 so that the camera carries out photographing according to various depths of field. A user may take a plurality of photographs having various depths of field by selecting the photographic mode switch S2. If the user does not select the photographic mode switch S2, the camera carries out normal photographing in a normal photographic mode.

When the user presses the photographic mode switch S2, the microcontroller 30 establishes a photographic mode according to a signal from the switch S2. In this example, assume the user selects the successive varying depths of field program. The microcontroller 30 produces a signal for displaying information on an information display 70. The information display 70 receives the signal from the microcontroller 30 and displays that the photographic mode switch S2 is activated to the successive photographs at varying depths of field (Step 120).

The microcontroller 30 then determines whether the release switch S1 is activated in the first step as follows.

When the user presses a release button (not shown) to take the photograph of the object, the release switch S1 is activated in the first step as the switch is connected to A as shown in FIG. 1. A corresponding signal is then sent to the microcontroller 30, and the microcontroller 30 determines that the release switch S1 is activated in the first step.

When the release switch S1 is activated in the first step, the microcontroller 30 activates the automatic distance measuring circuit 10 and the brightness measuring circuit 20. The automatic distance measuring circuit 10 measures the distance from the object, and the brightness measuring circuit 20 measures the ambient brightness around the object (Steps 140 to 150).

The automatic distance measuring circuit 10 measures the distance from the object according to a signal from the microcontroller 30, and sends a signal corresponding to the measured distance to the microcontroller 30. The brightness measuring circuit 20 measures the ambient brightness around the object, and sends a signal corresponding to the measured brightness to the microcontroller 30.

Next, the microcontroller 30 determines that the release switch S1 is activated in the second step as the switch is connected to B as shown in FIG. 1 (Step 160).

The camera lens includes a diaphragm which regulates the size of the opening of the lens when a picture is taken. Thus, the diaphragm sets the aperture or F stop. When the release switch S1 is activated in the second step, the microcontroller 30 calculates a suitable aperture range of the diaphragm. The open degree of the diaphragm is determined for obtaining a photograph having a suitable exposure corresponding to the measured distance to the object and the ambient brightness around the object (Step 170).

Generally, the aperture range of the diaphragm is between a maximum diaphragm open degree and a minimum diaphragm open degree, and the most suitable open degree of the diaphragm may be within the aperture range of the diaphragm.

In the preferred embodiment of the present invention, the microcontroller 30 calculates the maximum diaphragm open degree for obtaining the suitable exposure, the minimum diaphragm open degree for obtaining the suitable exposure, and the most suitable diaphragm open degree corresponding to the measured distance to the object and the ambient brightness around the object.

Figure 2:
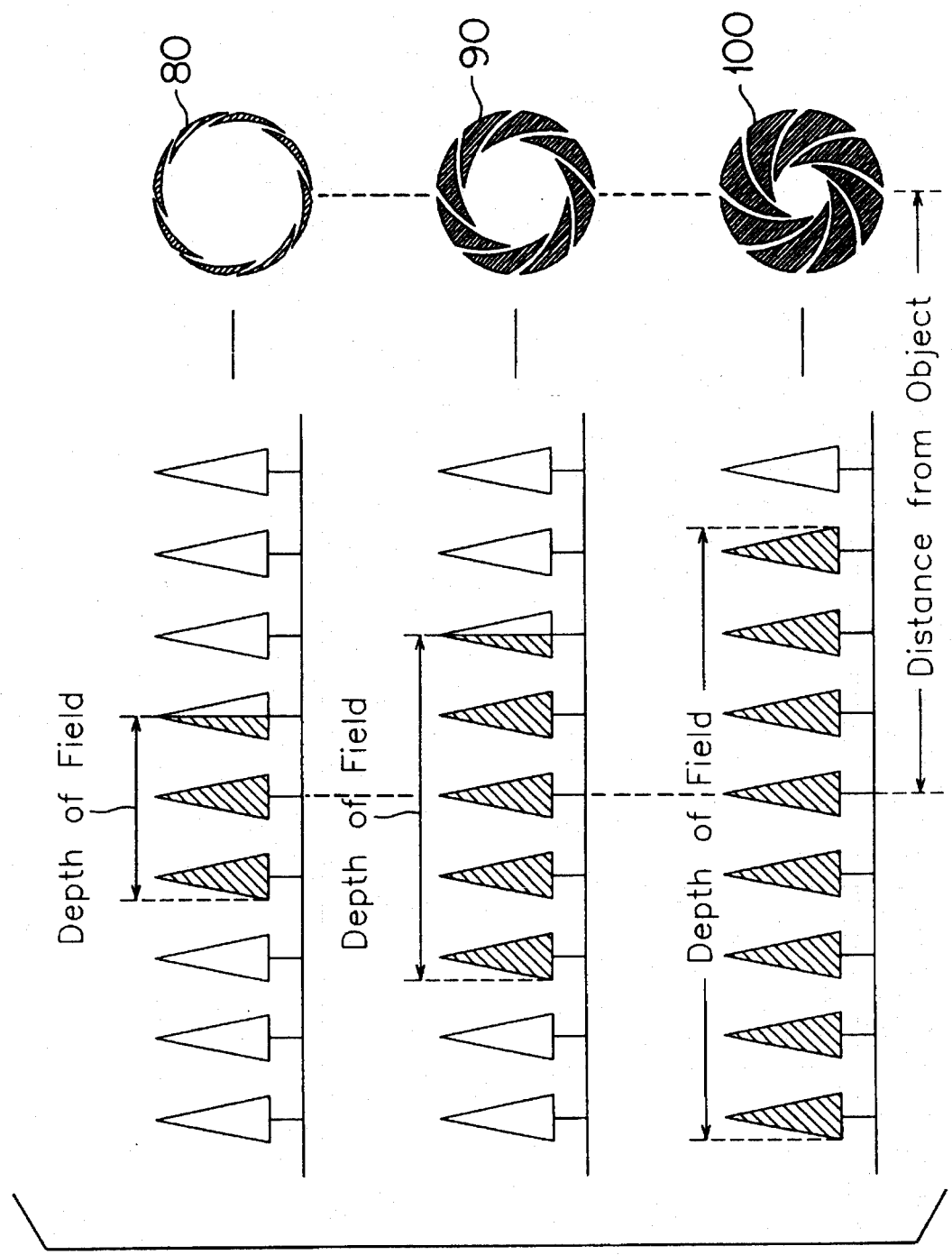
FIG. 2 is a view showing state of depths of field according to an open degree of diaphragm of the system for taking successive photographs at varying depths of field for a camera according to a preferred embodiment of the present invention.

The open degree of the diaphragm is closely related to the depth of field. Referring to FIG. 2, the smaller the aperture of the diaphragm, the deeper the depth of field, and the larger the aperture of the diaphragm, the shallower the depth of field. Thus, the diaphragm 80 yields the least depth of field, while the diaphragm 100 yields the greatest depth of field. To obtain the same exposure value, a longer shutter speed is required with the diaphragm 100 than with the diaphragm 80.

When the aperture range of the diaphragm corresponding to the measured distance from and the ambient brightness around the object is determined, the microcontroller 30 determines whether the established photographic mode involves successive photographs at varying depths of field (Step 180).

When the established photographic mode is the photographic mode for varying depths of field, the microcontroller 30 takes the photographs step by step by depths of field within the aperture range of the diaphragm. The steps of the depths of the field may be two or more, and three depths of field exposures are embodied in the preferred embodiment of the present invention.

The process of photographing by depths of field is as follows.

When the photographic mode by depths of field is established, the microcontroller 30 calculates a shutter speed suitable for the maximum diaphragm open degree in which the depth of field is the shallowest within the aperture range of the diaphragm corresponding to the measured distance to the object and the ambient brightness around the object.

The microcontroller 30 carries out the photographing by activating the diaphragm actuator 50 and the shutter actuator 40 to control the aperture of the diaphragm and the shutter (not shown) corresponding to the measured suitable exposure value, that is, the aperture of the diaphragm and the corresponding shutter speed (Step 190).

When the photographing is finished, the microcontroller 30 activates the film motor actuator 60 to wind one frame of photographed film (Step 200).

Next, the microcontroller 30 calculates the shutter speed suitable for the minimum diaphragm open degree, activates the diaphragm actuator 50 to adjust the aperture of the diaphragm to the minimum diaphragm open degree in which the depth of field is the deepest, activates the shutter actuator 40 at the shutter speed corresponding to the aperture of the diaphragm, and carries out photographing (Step 210).

Again, the microcontroller activates the film motor actuator 60 to wind one frame of the photographed film (Step 220).

Lastly, the microcontroller 30 adjusts the aperture of the diaphragm to the open degree of the most suitable depth of field corresponding to the measured distance to the object and the ambient brightness around the object, carries out the photographing at the shutter speed corresponding to aperture of the diaphragm (Step 230), winds one frame of the photographed film (Step 240), and ends the operation (Step 250).

If the established photographic mode is not the photographic mode by depths of field, the microcontroller 30 carries out normal photographing.

As described above, in the system for taking successive photographs by depths of field for a camera and related control method, the microcontroller 30 calculates the aperture range of the diaphragm to obtain the photograph, varies the open degree of the diaphragm within the aperture range, calculates the shutter speed corresponding to the varied open degree of the diaphragm, and carries out the successive photographing at varying depths of field, such that the user can obtain the photographs having the various depths of field simultaneously and easily. According to the invention, the successive photographs are taken so quickly as to appear simultaneous to the user. Actually taking simultaneous photographs at varying depths of field is also possible. Multiple exposures on the same frame of film are also possible by the camera operation described but without film winding between the multiple exposure operations.

Other embodiments of the invention will be apparent to those skilled in the art from consideration of the specification and practice of the invention disclosed herein. It is intended that the specification and examples can be considered as exemplary only, with a true scope and spirit of the invention being indicated by the following claims.

What is claimed is:

1. A system for automatically recording successive images of the same object at varying depth of field, comprising:

means for measuring light and for calculating an exposure value;

means for adjusting the depth of field of a recorded image; and means for recording multiple images of the object, each image having the same exposure value and a different depth of field.

2. The system of claim 1, wherein the means for recording includes means for recording two images, one image at the minimum depth of field and one image at the maximum depth of field.

3. The system of claim 1, wherein the means for recording includes means for recording three images, one image at the minimum depth of field, one image at the maximum depth of field, and one image at a median depth of field.

4. The system of claim 1, wherein the means for adjusting the depth of field includes a diaphragm for controlling the aperture of a lens.

5. The system of claim 1, wherein the means for measuring light includes a reflected light meter.

6. The system of claim 1, wherein the means for measuring light includes an incident light meter.

7. A system for automatically recording successive images of the same object at varying depths of field for a camera having a diaphragm controlled aperture to adjust the depth of field, comprising:

a release switch activated in first and second steps;

first means for measuring the distance from the object to the camera and for producing a first signal corresponding to the distance when the release switch is activated in the first step;

second means for measuring the ambient brightness around the object and for producing a second signal corresponding to the brightness when the release switch is activated in the first step;

third means for calculating a suitable aperture range using the distance measured by the first means and the ambient brightness measured by the second means when the release switch is activated in the second step, calculating a suitable exposure value corresponding to a plurality of apertures and for producing third signals for controlling the aperture and shutter speed in accordance with the suitable exposure value to record at least two successive images at varying depths of field;

fourth means for adjusting the aperture in accordance with the third signals; and fifth means for activating a shutter in accordance with the third signals.

8. The system of claim 7, further comprising a photographic mode switch by depths of field, wherein the third means includes means for calculating the suitable exposure value when the photographic mode switch by depths of field is activated.

9. The system of claim 8, further comprising sixth means for displaying that the photographic mode switch by depths of field is activated, wherein the third means includes means for producing a signal for displaying information when the photographic mode switch by depths of field is activated and the sixth means includes means for receiving the signal for displaying information and displays that the photographic mode switch by depths of field is activated.

10. The system of claim 7, wherein the third means includes means for calculating the suitable exposure values for the minimum and maximum apertures, such that two photographs having the deepest and shallowest depths are obtained.

11. The system of claim 7, wherein the third means includes means for calculating the suitable exposure value for the minimum, maximum and median apertures, such that three photographs having the deepest, shallowest and median depths are obtained.

12. A method for automatically recording successive images of the same object at varying depths of field for a camera having a diaphragm controlled aperture to adjust the depth of field, comprising the steps of:

initializing an internal circuit of the camera when power is applied;

measuring the distance from the object to the camera and the ambient brightness around the object when a release switch is activated in a first step;

calculating a suitable aperture range using the measured distance and the measured ambient brightness when the release switch is activated in a second step, and calculating a suitable exposure value corresponding to a plurality of apertures; and activating the diaphragm and a shutter in accordance with the suitable exposure value and taking a plurality of photographs each having a different depth of field.

13. The method of claim 12, wherein the suitable exposure value is calculated for the minimum and maximum apertures in the step for calculating the suitable exposure values, such that two photographs having the deepest and shallowest depths of field are obtained.

14. The method of claim 12, wherein the suitable exposure value is calculated for the minimum, maximum, and median apertures in the step for calculating the suitable exposure value, such that three photographs having the deepest, shallowest, and median depths of field are obtained.

15. A method for automatically recording successive images of the same object at varying depths of field for a camera having a diaphragm controlled aperture to adjust the depth of field, comprising the steps of:

initializing an internal circuit of the camera when power is applied;

measuring a distance from the object to the camera and the ambient brightness around the object when a release switch is activated in a first step;

calculating a suitable aperture range from the measured distance and the measured ambient brightness when the release switch is activated in a second step, and calculating a suitable exposure value corresponding to a plurality of apertures when a photographic mode switch by depths of field is activated; and activating the diaphragm and a shutter in accordance with the suitable exposure value and taking a plurality of photographs each having a different depths of field.

16. The method of claim 15, wherein the suitable exposure value is calculated for the minimum and maximum apertures in the step for calculating the suitable exposure value, such that two photographs having the deepest and shallowest depths of field are obtained.

17. The method of claim 15, wherein the suitable exposure value is calculated for the minimum, maximum, and median apertures in the step for calculating the suitable exposure value, such that three photographs having the deepest, shallowest, and median depths are obtained.

18. The method of claim 15, further comprising the step of displaying that the photographic mode switch by depths of field is activated when the photographic mode switch by depths of field is activated.

19. The method of claim 18, further comprising the step of displaying the open degree of the diaphragm and the speed of the shutter calculated in the step for calculating the suitable exposure value.

* * * * *